(No Model.)
J. BOWLES.
COMBINED SAW AND PLANER.
No. 503,522. Patented Aug. 15, 1893.
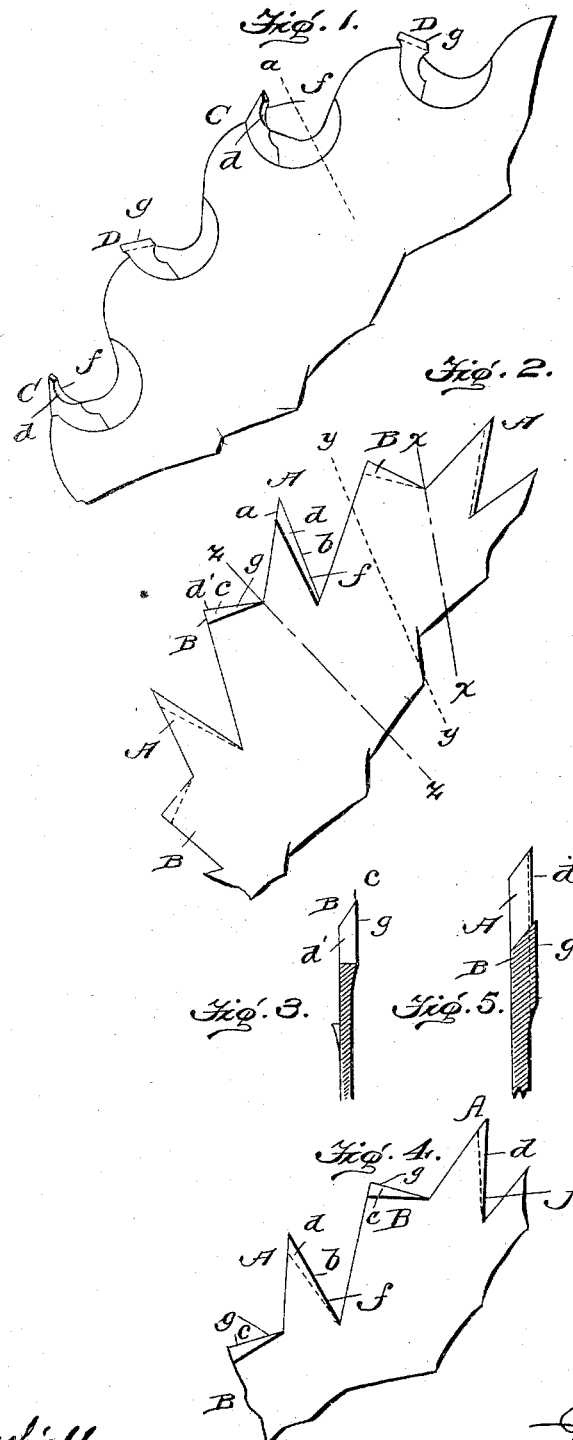
WITNESSES:
INVENTOR
John Bowles
BY Edson Bro's
ATTORNEYS.

UNITED STATES PATENT OFFICE.

JOHN BOWLES, OF WASHINGTON, DISTRICT OF COLUMBIA, ASSIGNOR OF ONE-HALF TO CORNELIUS S. MITCHELL, OF NEW YORK, N. Y.

COMBINED SAW AND PLANER.

SPECIFICATION forming part of Letters Patent No. 503,522, dated August 15, 1893.

Application filed April 12, 1892. Serial No. 428,870. (No model.)

*To all whom it may concern:*

Be it known that I, JOHN BOWLES, a citizen of the United States, residing at Washington, in the District of Columbia, have invented certain new and useful Improvements in a Combined Saw and Planer; and I do hereby declare the following to be a full, clear, and exact description of the invention, such as will enable others skilled in the art to which it appertains to make and use the same.

My present invention relates to a combined saw and planer in which the teeth are so constructed and organized that the surfaces of the log or wood are planed or smooth while in the act of sawing the same into boards or pieces, and thus save the time, labor and expense required to rehandle and plane the wood after it has been sawed besides preventing waste of the wood in saw dust and shavings which is very desirable when working hard, expensive woods.

By this invention I produce a saw and planer which is well adapted for all practical purposes to the sawing and planing of logs in the rough, unseasoned timber, and resinous woods which heretofore it has been well nigh impossible to plane or smooth during the sawing operation, as well as to working hard expensive woods in which it is desirable to avoid undue waste of the material.

The invention contemplates, first, the novel construction of the cutting tooth whereby it is also adapted to partially plane or smooth the surfaces of the wood while sawing the fibers or grain of the same.

The invention further consists in the combination with the cutting teeth, of a series of planer teeth arranged alternately with respect to the cutter teeth. In the preferred embodiment of my invention, the planer teeth are not made as long as the cutting teeth, or in other words, the outer extremities of the planer teeth terminate within the path cut by the working or tearing edges of the cutter teeth, to prevent the planer teeth from cutting across the fiber or grain of the wood. The adjacent planer and cutter teeth constitute one group or pair of teeth, of which a large number are provided around the periphery of the saw blade; and to secure greater efficiency of the planer teeth, the working surfaces of said planer teeth are inclined or canted at an acute angle and in one direction backward to a radius of the saw blade while the working face of the cutter tooth of said group is inclined in the other direction forward to the same radius of the saw blade as will be presently specified.

The invention further consists in the peculiar arrangement and construction of parts which will be hereinafter fully described and pointed out in the claims.

My improvements are equally well adapted to a solid plate saw and to a saw using insertible teeth; and in the annexed drawings, forming a part of this specification, I have illustrated the invention adapted to both forms of the saw and will hereinafter specifically describe such adaptations.

In said drawings, Figure 1 is a side elevation of a portion of a saw having insertible planer and cutter teeth embodying my invention. Fig. 2 is a solid plate saw having my cutter and planer teeth. Fig. 3 is a section through the solid plate saw shown in Fig. 2, and on the plane indicated by the dotted line $x-x$ of said Fig. 2. Fig. 4 is a view of a modified form of my invention. Fig. 5 is an enlarged sectional view on the plane indicated by the dotted line $y, y$, of Fig. 2, showing one of the planer teeth in section and the adjacent cutter tooth in front elevation, showing the planing or shaving edge on the planer teeth projecting farther beyond the face of the saw plate than the paring edge on the cutter tooth.

Like letters of reference denote corresponding parts in the several figures of the drawings.

Referring more particularly to Figs. 1 and 2, A, A, designate a series of the cutting teeth and B, B, is a series of planer teeth being arranged between the cutting teeth and alternating therewith.

The adjacent pairs of cutter and planer teeth constitute what I shall hereinafter designate as a "group" or pair of teeth, each group comprising one planer tooth and one cutting tooth; thus the first and second teeth A, B, form one group, the third and fourth teeth A, B, a second group; fifth and sixth teeth A B a third group, and so on entirely around the periphery of the saw blade. The cutter teeth project farther beyond the periphery of the saw blade than the planer teeth, or in other words, the outer extremity of each planer tooth terminates within the path described by the working incision or tearing edge *a* of the cutter teeth to prevent the planer teeth from coming in contact with the cross grain or fibers of the wood and thus prevent said planer teeth from being unduly heated while the saw is in operation. Each cutter tooth has a front working surface *b* within the tearing or incision point *a*, and likewise each planer tooth has a similar working face *c*; but in order to increase the efficiency of the planer tooth, the angle or inclination of its working face *c* is reversed to that of the working face *b* of the adjacent cutter tooth; for instance, let the dotted line Z, Z, of Fig. 2 represent a radius of the saw blade extending between the teeth of the group A, B, and it will be seen that the face *c* of the planer tooth B is inclined toward the left hand of the dotted line while the face *b* of the cutter tooth A is inclined toward the right hand of said line, and, furthermore it will be seen that the angle of the face *c* of the planer tooth to the line Z, is greater than the inclination of the face *b* of the cutter tooth to said line. Each insertible cutter tooth C, D, has its tearing or incision edge *a* made square or at right angles to the faces of the tooth and the saw blade, and within this cutting edge *a* the face *b* of the cutter tooth is beveled or inclined at *d* so as to throw or project one side edge in advance of the other, and thereby form a shaving or paring edge *f* which projects laterally beyond one face of the tooth. The planer tooth of the group or pair to which it belongs has its front face *c* likewise beveled at *d'* to provide the planer edge *g*, the bevel *d'* extending in the same direction as the bevel *d* of the fellow cutter tooth and the planing edges *f*, *g*, of the cutter and planing teeth of the group extending in the same direction to one side of said teeth. The groups of teeth have their planing edges *f*, *g*, extending in opposite directions beyond the plane of the saw blade; thus the teeth C, D, have their edges *f*, *g*, extending from the right hand side of the blade, the adjacent teeth C, D, have the edges *f*, *g*, projecting to the left hand side of the blade; the following teeth C, D, have their edges *f*, *g*, projecting to the right hand side of the blade in a similar way to the first named teeth C, D, and so on. As the cutter teeth are relied upon to do all the work in severing the boards from the log, I am enabled to extend the planer edges *g* of the planer teeth farther beyond the vertical axis of the blade than the shaving edges *f* of the cutter teeth; and in operation, the edges *f* of the cutter teeth serve to partially smooth the faces of the wood and the planer edges *g* of the planer teeth act to give a smoother finish to the wood than can be secured by the shaving edges on the cutter teeth alone, which is very desirable in sawing and planing hard expensive woods.

In Fig. 4 I have shown another embodiment of my invention in which the alternate planer and cutting teeth have their lateral shaving or paring edges projected in opposite directions; thus the paring edge of the tooth A is set to the right, the next tooth B has its edge set to the left, the tooth A is set to the right, and so on.

Referring now more particularly to Fig. 1, I illustrate the saw provided with insertible teeth which have all the characteristics of the cutter and planer teeth hereinbefore described and which are arranged in a similar manner. In Fig. 1, C, C, are the cutter teeth, each of which is locked or secured to the saw plate in any suitable or desirable manner, which however, forms no part of the present invention. The cutter teeth have the square or right angled incision point *a* at the apex of the tooth, and the transverse bevel *d* on the working face *b* thereof to advance or throw one edge *f* of the tooth in front of the other edge thereof.

The operation and advantages of my invention will be readily understood and appreciated by those skilled in the art, from the foregoing description taken in connection with the drawings.

No claim is herein made to the peculiar form of the insertible cutter tooth shown by Fig. 1, as the same forms the subject matter of a divisional application filed by me on the 19th day of November, 1892, Serial No. 452,578.

Having thus fully described my invention, what I claim as new, and desire to secure by Letters Patent, is—

1. In a combined saw and planer, the planer and cutting teeth arranged in groups, each group having its cutting tooth and its planer tooth provided with shaving or paring edges on one side thereof, as and for the purpose described.

2. In a combined saw and planer, the planer and cutter teeth arranged in groups, the cutter tooth of each group provided with a shaving or paring edge which projects laterally beyond the face of the saw plate or blade and the planer tooth having its lateral shaving edge projecting farther beyond the face of the saw plate or blade than the shaving or paring edge of the adjacent cutter tooth, substantially as and for the purpose described.

3. In a combined saw and planer, the cutter and planer teeth arranged in groups, with each cutter tooth having a lateral shaving or paring edge extended beyond one face of the saw plate and the cutter tooth likewise having a lateral shaving edge, the planer tooth of each group having its beveled working face lying at an angle backward to the radius of the saw blade and the corresponding beveled face of the cutter tooth inclined forward of said radius, substantially as and for the purpose described.

4. In a combined saw and planer, the series of cutter teeth each having its front working face beveled from one side to the other within the incision point thereof and provided with a shaving or paring edge which extends laterally beyond one face of the saw plate, combined with the alternate planer teeth having their outer extremities within the path described by the incision points of the cutter teeth and provided with the planing edges which extend laterally beyond the faces of the saw plate, substantially as described.

5. In a combined saw and planer, the planer and cutting teeth arranged alternately with relation to each other and each pair or group of teeth being provided on one side with lateral planing or shaving edges and the adjacent group or pair of teeth having similar edges on the other side, each pair or group being formed by one planer tooth and one cutting tooth, substantially as and for the purpose described.

6. In a combined saw and planer, the alternate cutting and planing teeth arranged in groups, one group of teeth being set to one side of the plane of the saw blade and the adjacent groups being set to the other side of the plane of the saw blade, for the purpose described.

7. In a saw and planer, a series of cutter teeth provided with shaving or paring edges within the incision points thereof and which project or extend beyond the lateral faces of the saw-blade or plate, combined with a series of planer teeth arranged alternately with relation to the cutter-teeth, substantially as and for the purpose described.

In testimony whereof I affix my signature in presence of two witnesses.

JOHN BOWLES.

Witnesses:
ARTHUR L. BRYANT,
H. J. BERNHOOD.